Feb. 19, 1952
C. J. LAMBERTSEN
2,586,670
SELECTIVE GAS ADSORBER
Original Filed Jan. 31, 1945
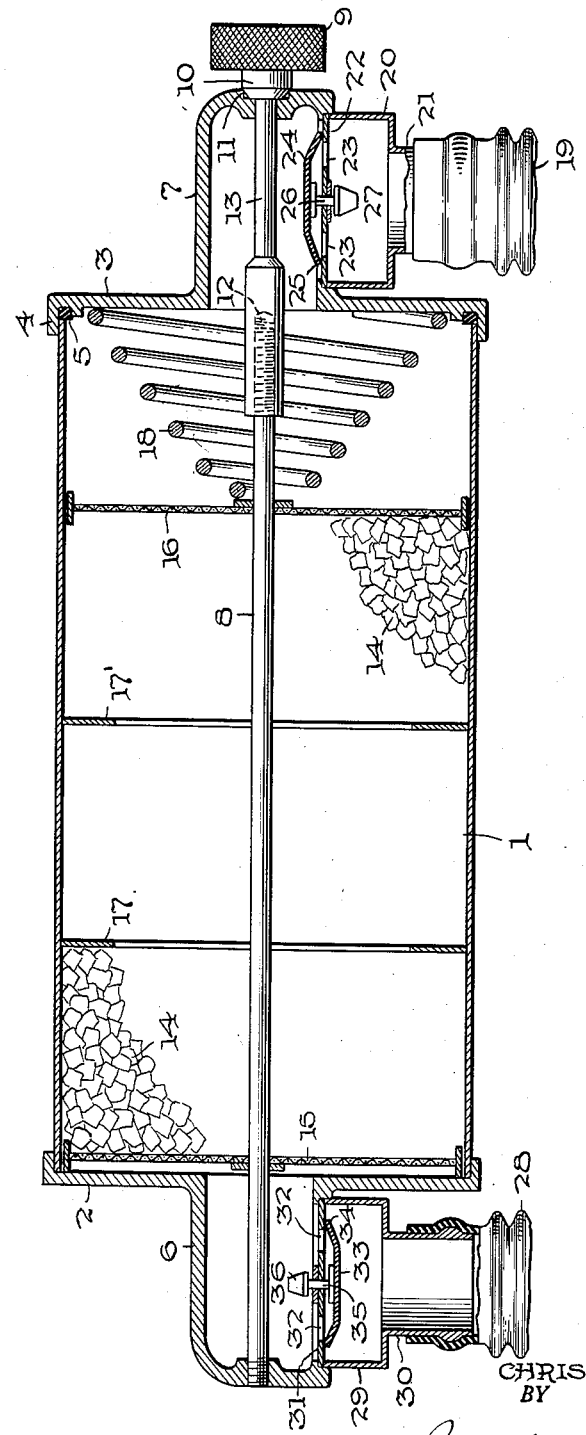
INVENTOR.
CHRISTIAN J. LAMBERTSEN
BY
Pennie Edmonds Morton & Barrows
ATTORNEYS Patented Feb. 19, 1952

2,586,670

UNITED STATES PATENT OFFICE 2,586,670

SELECTIVE GAS ADSORBER

Christian J. Lambertsen, Scotch Plains, N. J.

Original application January 31, 1945, Serial No. 575,386. Divided and this application May 4, 1948, Serial No. 25,044

2 Claims. (Cl. 183—4.4)

This invention is a division of my application Serial No. 575,386, filed January 31, 1945, Patent No. 2,456,130.

The invention relates to apparatus for selectively adsorbing a gas from a mixture of gases, and particularly to a device for selectively adsorbing carbon dioxide from a gaseous mixture containing the same, such as may be used in rebreathing systems used in connection with diving equipment, anesthesia, and the like. However, the apparatus is applicable for general use in selectively adsorbing a gas from a gaseous mixture by means of a granular, solid adsorbent.

When a mixture of gases is passed through a granular, solid adsorbent, there is a tendency, particularly if the gases are caused to pass horizontally through the adsorbent, for the gases to form channels through the solid adsorbent through which the mixture of gases will travel without the intimate contact with the adsorbent which is necessary to effect the selective adsorption of the desired gas. Also, if the adsorber is carried by a person, as where it forms a part of diving equipment, or otherwise is subjected to a shaking movement, there is a tendency for the particles of the granular adsorbent to abrade one another with resultant formation of a powder which, in a horizontally-disposed adsorber, settles to the bottom and leaves an open space at the top of the adsorber through which the gaseous mixture will pass without being brought into sufficiently intimate contact with the solid adsorbent. Such powdering of the adsorbent is further objectionable in that some of it will be entrained in the gases passing through the adsorber and removed therefrom. If the adsorber is part of a re-breathing apparatus, such entrained particles of powder will be inhaled and cause irritation of the lungs.

In accordance with the present invention, apparatus for selectively adsorbing a gas from a mixture of gases is provided in which means are provided for continuously maintaining the particles of solid adsorbent tightly pressed against one another so that even if the adsorber is shaken there is no appreciable relative movement of the solid particles relative to one another so that a minimum of abrading with resultant formation of powder takes place. The device also includes means for preventing the normal tendency of the gaseous mixture passing through the solid adsorbent to form channels therein.

More specifically, the present invention provides apparatus for selectively adsorbing carbon dioxide or other gases from a mixture of gases in which a spring-pressed foraminous plate or screen constantly is pressed against one side or end of the body of granular, solid adsorbent in order to maintain the particles thereof tightly pressed against one another, and in which means, preferably in the form of baffles, extend inwardly from the walls of an enclosing container into the body of solid adsorbent a distance sufficient to interfere with the straight passage of the gaseous mixture through the container along the side walls thereof, whereby the gases passing along the side walls of the container on engaging the baffles are deflected inwardly into the center of the body of adsorbent, so that intimate contact with all portions of the body of solid adsorbent is obtained and channeling is prevented.

The invention will be further described in connection with the accompanying drawing in which the figure is a longitudinal sectional view through a carbon dioxide adsorber of the type adapted for use in a re-breathing system, showing portions of the conduits for introducing the gaseous mixture at one end and for conducting the gases freed of the carbon dioxide from the other end.

The selective gas adsorber comprises a cylindrical container or canister 1, one end 2 of which permanently is closed while the other end is closed by a removable lid 3 having a flange 4 which forms a slit fit with the open end of the canister.

A packaging ring 5 secured in a recess in the inner face of the lid 3 near the periphery thereof forms a gas-tight connection when the lid is pressed against the open end of the canister.

The end 2 has an axial extension 6 extending outwardly therefrom, while a similar axial extension 7 extends outwardly from the removable lid 3.

In order to press the removable lid 3 tightly against the packaging 5 to make a gas-tight joint, an axially-extending rod 8 has one end thereof screwed into the axial extension 6, while the other end of the rod extends through the axial extension 7 and has a knurled nut 9 threaded onto the free end of the rod 8. The knurled thumb nut 9 has intimately formed therewith a hub portion 10 which bears against a seat 11 in the end of the axial extension 7. Thus, when the thumb nut 9 is screwed onto the end of the rod 8, the hub 10 will be forced against the outer end of the axial extension 7 and cause the lid 3 to be pressed tightly against the open end of the canister to form a gas-tight connection. If desired, the rod 8 may be formed of telescoping sections screwed together as at 12, or the end section 13 may be formed integrally with the thumb nut 9 and the clamping of the lid to the canister obtained by screwing the section 13 onto the main section of the rod 8.

When the device is to be used for the selective adsorption of carbon dioxide from exhaled gases, such as is the case when it is used as a part of diving, anesthesia, or oxygen administration equipment, the canister is filled with a body of particles of solid soda-lime 14 (a mixture of 60% granular calcium hydroxide coated with 5% sodium hydroxide, and 35% inert material), "Barolyme" (a granular mixture of 80% calcium hydroxide and 20% barium hydroxide), or any other suitable material which has the property of selectively adsorbing carbon dioxide from other gases. If a gas other than carbon dioxide is to be selectively adsorbed from a mixture of gases, the composition of the granular, solid adsorbent will be one particularly adapted for the selective adsorption of the desired gas. The solid adsorbent is retained within the canister between a pair of foraminous screens or plates 15 and 16. The screen or plate 15 may either be rigidly secured to the rod 8 or may be slidable therealong, and normally is positioned at the closed end of the canister. However, the screen or perforated plate 16 is slidable along the connecting rod 8, so that it may be moved therealong towards the screen or plate 15. The screens or plates 15 and 16 retain the particles of solid adsorbent material between them while permitting the gaseous mixture from which the carbon dioxide or other gas selectively is to be adsorbed to pass freely through them.

Gas passing horizontally through a body of granular solid adsorbent has a tendency to form channels therein, particularly along the side walls of the surrounding container. In order to prevent such channeling in the body of solid adsorbent 14, and to insure that the gaseous mixture from which the carbon dioxide is to be adsorbed is caused to pass through all portions of the body of adsorbent material, removal baffle rings 17 and 17' which extend inwardly from the inside walls of the canister are inserted in the body of solid adsorbent during the filling of the canister. If desired, the baffle rings may be formed integrally with the interior of the canister, although it is preferred that they be free of the canister as the canister can be more completely filled behind the rings if they are removable and are inserted during the filling operation.

The baffle rings 17 and 17' prevent free passage of the gaseous mixture longitudinally of the canister along the side walls thereof and divert the gases passing through the canister adjacent the side walls into the center of the body of adsorbent material.

A relatively large conical spring 18 is placed between the end of the movable screen or plate 16 and the removable lid 3, and through the movable screen or plate exerts a pressure against one end of the body of adsorbent so that the individual particles thereof are pressed sufficiently tightly against one another to prevent substantial abrading of the particles one against the other such as would occur if the adsorbent was loosely packed in the canister.

The size of the canister and the amount of carbon dioxide contained therein will depend upon the place and manner in which it is used. If it is used as a part of the re-breathing system of diving apparatus which carries a supply of oxygen for the diver, it usually is preferred that the adsorbent be replaced every time the supply of oxygen is replaced. In such case the amount of the adsorbent would be sufficient to adsorb the carbon dioxide formed by the body when inhaling an amount of oxygen equal approximately to one and one-half times that carried by the diving equipment, so that an ample excess of adsorbent is provided to insure complete and satisfactory adsorption of all carbon dioxide passing therethrough.

The dimensions of the canister 1 are such that the ratio of its diameter to its length is such as to give maximum adsorption of carbon dioxide to minimum resistance to the passage of the gaseous mixture through the adsorbent contained therein.

A conduit for gases containing carbon dioxide, such as a corrugated rubber exhalation tube 19 of diving equipment, anesthesia apparatus, or the like, is connected to the axial extension 7 by a short connector 20 secured thereto. The conduit 19 slips over a neck 21 of the connector and is secured thereto in any desired manner.

A metal partition plate 22 is clamped between the inner end of the connector 20 and one side of the axial extension 7. The partition plate is provided with perforations 23 for the passage of the gaseous mixture containing the carbon dioxide to be adsorbed. Backflow of the gaseous mixture from the canister 1 into the gaseous admission conduit 19 is prevented by a cupped rubber disc valve 24 at the inner side of the partition plate 22. The edges 25 of the valve 24 normally bear against the partition radially outwardly beyond the perforations 23. A stem 26 connected to the center of the valve 24 passes through an opening in the center of the partition plate 22 and has a cutoff tail 27 at the outer side of the plate 22 to hold the valve in its normal position.

The edge 25 of the valve bears against the partition plate 22 with such light pressure that the pressure of the gaseous mixture in the admission conduit 19 is sufficient to lift it and permit the passage of the gaseous mixture thereunder and into the canister 1. However, a pressure on the other side of the valve, even though slight, presses the valve tighter against the partition plate 22 to form a better seal against the return flow of gases from the adsorber into the gaseous admission conduit.

At the other end of the adsorber, a tube 28 for the discharge of gases from which the carbon dioxide has been adsorbed is connected to the axial extension 6 by a connector 29 having a neck portion 30 over which the conduit 28 is passed and clamped in any appropriate manner.

A perforated partition plate 31, similar to the partition plate 22, is clamped between the inner end of the connector 29 and the axial extension 6. The partition plate 31 is formed with perforations 32 for the passage of gases from which the carbon dioxide has been adsorbed. Backward flow of gases from the discharge conduit 28 into the closed discharge end of the canister is prevented by a cupped rubber disc valve 33, the edge 34 of which normally bears against the outer sides of the partition plate, radially outwardly beyond the perforations 32. A stem 35 connected to the center of the valve 33 passes through an opening in the center of the partition plate 31 and has a cut-off tail 36 at the inner side of the partition plate to hold the valve in its normal position. The edge of the valve 33, like the edge 25 of the valve 24, bears against the partition plate 31 with such light pressure that a slight suction in the discharge conduit 28, or a slight pressure exerted by the gases passing through the canister is sufficient to cause the edge 34 to be lifted from the partition plate sufficiently to permit the flow of gases from which carbon dioxide has been removed from the extension 6 into the discharge conduit 28.

From the aforegoing it will be seen that the solid adsorbent within the canister at all times is maintained in a compressed state due to the pressure exerted by the spring 18 against the movable screen or plate 16, so that abrading of the particles of solid adsorbent against one another with resultant formation of powder which would be entrained in the gases passing through the adsorber for rebreathing, or which would settle to the bottom of the canister and leave a free passage through the canister at the top for the gaseous mixture is avoided. Also, it will be apparent that the baffle rings 17 and 17' will be effective to divert the gaseous mixture passing through the canister along the side walls thereof inwardly into the center of the body of solid adsorbent so that channeling of the gaseous mixture through the solid adsorbent, particularly around the side walls, is prevented and the gaseous mixture is caused to pass through all portions of the adsorbent material.

Various changes may be made in the structure of the apparatus shown in the drawing without departing from the invention or sacrificing the advantages thereof.

I claim:

1. Apparatus for selectively adsorbing a gas from a gaseous mixture containing said gas comprising a container body, an end closure permanently secured to one end of said body, a removable end closure secured to the other end of said body, a rod connected to said first end closure and extending longitudinally of the container, means threadedly connected to the free end of said rod and bearing on the outer end of the removable closure and adapted to exert a pressure on the outer side of said removable end closure to force it against and in contact with said body portion, foraminous screens within said container and surrounding said rod for retaining a body of granular, solid material which selectively will absorb said gas from a gaseous mixture containing said gas, said solid material being disposed between said screens the screen adjacent the removable end closure being movable longitudinally of the container along said rod, and spring means interposed between said movable screen and the removable end closure for exerting a pressure against said movable screen to urge it in a direction towards said other screen to maintain the adsorbent material between said screens in a compacted condition.

2. Apparatus for selectively adsorbing a gas from a gaseous mixture containing said gas comprising a container body, an end closure permanently secured to one end of said body, a removable end closure secured to the other end of said body, a rod connected to said first end closure and extending longitudinally of the container, means threadedly connected to the free end of said rod and bearing on the outer end of the removable closure and adapted to exert a pressure on the outer side of said removable end closure to force it against and in contact with said body, foraminous screens within said container and surrounding said rod for retaining a body of granular, solid material which selectively will adsorb said gas from a mixture of gases containing said gas, said solid material being disposed between said screens, the screen adjacent the removable end closure being movable longitudinally of the container along said rod, and spring means interposed between said movable screen and the removable end closure for exerting a pressure against said movable screen to urge it in a direction toward said other screen to maintain adsorbent material between said screens in a compacted condition, and at least one removable baffle ring extending inwardly from the wall of said container to lie in a body of adsorbent material within said container and adapted to deflect gases tending to pass along the container wall inwardly into adsorbent material within the container.

CHRISTIAN J. LAMBERTSEN.

REFERENCES CITED

The following references are of record in the file of this patent:

UNITED STATES PATENTS

| Number | Name | Date |
|---|---|---|
| 805,305 | Lieber | Nov. 21, 1905 |
| 1,621,026 | Pukerud | Mar. 15, 1927 |
| 1,944,279 | Skelton | Jan. 23, 1934 |
| 2,115,946 | Eaton | May 3, 1938 |
| 2,116,537 | Miller | May 10, 1938 |
| 2,345,530 | Connell | Mar. 28, 1944 |

FOREIGN PATENTS

| Number | Country | Date |
|---|---|---|
| 252,610 | Great Britain | June 3, 1926 |
| 214,929 | Switzerland | Aug. 16, 1941 |